Aug. 8, 1933.   H. S. WALKER   1,921,056
DUCT FITTING
Filed May 29, 1931
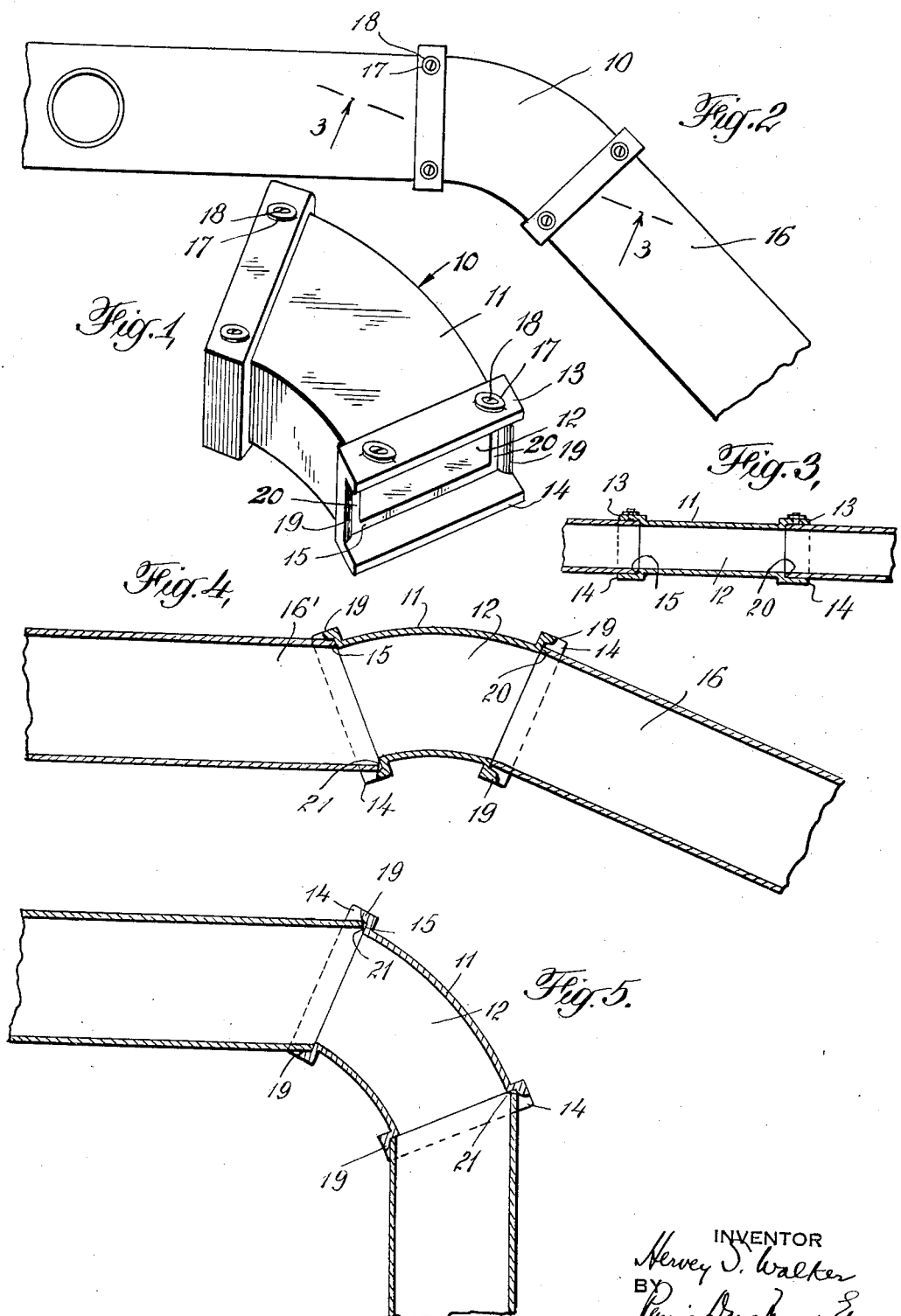

Patented Aug. 8, 1933

1,921,056

UNITED STATES PATENT OFFICE 1,921,056

DUCT FITTING

Hervey S. Walker, Ardmore, Pa.

Application May 29, 1931. Serial No. 540,941

5 Claims. (Cl. 247—31)

This invention relates to a novel elbow fitting for use in connecting ducts together as an angle. The fitting is intended primarily for use in connection with underfloor duct systems and it provides a means for changing the direction of a run of duct through varying angles from 0 to 90 degrees. For purposes of illustration an embodiment of the invention for use in connection with underfloor ducts of oblong section will be described although it will be evident that the utility of the invention is not limited to ducts of that particular shape.

In modern concrete office buildings, particularly for office purposes, it is now the common practice to install ducts in the floor for the purpose of concealing the wiring for electric lights, telephones, annunicators, and the like. These ducts are arranged ordinarily in a network consisting of parallel runs of duct, lying within the floor structure and intersecting at spaced intervals with similar runs laid at right angles, cross-over boxes or junction boxes, in which connections between duct wiring or from feeder wires to duct wiring can be made, being placed at the intersections.

In the installation of such a duct system it sometimes becomes necessary to change the direction of the ducts or to deflect them for various reasons. The ducts cannot be bent with facility and such bending is highly objectionable because the duct is likely to be distorted so as to interfere with the introduction of the wiring.

The present invention is accordingly directed to the provision of a fitting by which a change in direction of the duct may be accomplished without difficulty and this fitting provides turns of relatively large curvature so that resistance to the introduction of wiring or injury to conductors while being introduced is avoided. At the same time the fitting makes it possible to change the direction of the duct through a variety of angles so that it is not necessary to employ fittings of different curvatures for the various changes in direction which may be encountered in any particular installation.

For a better understanding of the invention, reference may be had to the accompanying drawing in which Fig. 1 is a perspective view of the new duct fitting of this invention;

Fig. 2 is a plan view of a section of underfloor duct turned at an angle of 45° by means of the new fitting of the invention;

Fig. 3 is a vertical section on line 3—3 of Fig. 2; and

Figs. 4 and 5 are longitudinal sections illustrating respectively the method of making 22½° and 90° turns in duct by means of the new fitting.

Referring now to Fig. 1 of the drawing, the new duct fitting generally designated 10, includes a metal body portion 11 of rectangular cross-section, conforming in general to the dimensions of the duct with which it is adapted to cooperate, curved in the plane of its widest or normally horizontal section at a wide angle such as 45°, and having a passage 12 therethrough. Each end of the hollow body portion 11 is provided with wide upper and lower flanges 13 and 14, which are offset so as to provide the shoulders 15 at the ends of the body portion and are spaced apart a distance slightly in excess of the thickness of the duct 16, so as to readily accommodate the end thereof in abutting engagement with the shoulders 15 in the manner illustrated in Fig. 3.

The upper flanges 13 at each end of the fitting 10 are provided with a pair of threaded bosses 17, through which and corresponding flange 13 pass the grounding screws 18 for securing the ends of the duct 16 to the fitting 10, as shown in Figs. 2 and 3. Connecting upper and lower end flanges 13 and 14 are a pair of shallow side flanges 19, also offset laterally to provide the shoulders 20 and spaced apart a distance somewhat greater than the width of the duct 16. The inner faces of the side flanges 19 are curved outwardly as shown.

In making ordinary 45° turns, the adjacent ends of the two ducts 16 are cut off square and inserted in the end sockets of the fitting 10, these sockets being formed by the flanges 13, 14, and 19, and the shoulders 15 and 20. The screws 18 are tightened down at each end to engage the top surfaces of the ducts 16 to complete the joint, as shown in Figs. 2 and 3. It will be seen that the wide angle and curvature of this type of turn offers no obstruction to the drawing of cable or wire through the duct. The interior surfaces of the duct and fitting 10 lie flush with each other because of the shoulders 15 and 20 of the latter, and the entire assembly is smooth and workmanlike.

In making turns other than the 45° turn described a different procedure is followed. To make a turn of 22½°, the end of one duct 16 is cut off square and inserted and secured in the end of the fitting in the ordinary manner while the end of the other duct 16' is cut off at an angle of 22½°. The end of the duct 16' is then inserted in the fitting and in such fashion that the projecting edge of the duct lies at the inner side of the turn. Since in cutting the duct diagonally in this manner, the overall width of the portion which is to be received in the end of the fitting is somewhat greater than the overall width of a square cut end it will be necessary to cut off the edge of the duct as indicated at 21 and this permits the diagonally cut end of the duct to be received properly in the socket in the fitting and secured in place by the screws 18. With this arrangement it will be apparent that the angle at which duct 16 and duct 16′ intersect is 22½°. The cutting off of duct 16′ and its assembly with the fitting in the manner described reduces the amount of the turn which would otherwise be afforded by the fitting.

When it is desired to employ the fitting for a 90° bend as illustrated in Fig. 5, the ends of both ducts 16 and 16′ are cut off at angles of 22½° and these ducts are assembled with the fitting in such fashion that their projecting edges lie on the outer side of the turn. The diagonal cutting of the two duct ends, each at 22½°, adds 45° to the turn and since the fitting itself imparts a turn of 45°, the total turn is of 90°. By cutting off one or both duct ends at different angles and employing the fitting in the manner described, the duct may be turned through angles varying from 0 to 90° although it is obvious that for ordinary purposes turns of only a few different angles will be required. However, because of the capability of using the fitting to produce a wide variety of turns the fitting is of great utility and a single fitting of this type may be employed for all ordinary purposes in the duct system whereas if it were not for the possibility of producing turns at different angles in a single fitting, it would be necessary to provide many different fittings to accomplish the same results.

I claim:

1. A duct fitting comprising a body having a longitudinal passage therethrough, a pair of parallel flanges on at least one end of the body at opposite sides of the passage and a pair of outwardly flaring flanges connecting the first named flanges to form a socket and being laterally offset to form a shoulder for receiving the end of a duct in abutting relation, the free ends of said flaring flanges being recessed relatively to the ends of the parallel flanges.

2. A duct fitting comprising a body having a longitudinal passage therethrough, a pair of parallel flanges on at least one end of the body at opposite sides of the passage and laterally offset therefrom to form a shoulder at the end of the passage between the flanges and the body for receiving the end of a duct in abutting relation, and a pair of shorter flanges connecting the parallel flanges and laterally offset to form a shoulder corresponding to the first-named shoulder, said last-named flanges having outwardly curved interior surfaces.

3. A duct fitting comprising a curved body of rectangular cross-section and having a passage therethrough, relatively wide upper and lower flanges extending from each end of the body at opposite sides of the passage and connected at their ends by relatively short side flanges flaring outwardly to form sockets at each end of the body, and shoulders formed within the socket adjacent at least two flanges at each end of the body to receive the end of duct in abutting relation, and means for securing the end of duct inserted in the sockets formed by flanges at each end.

4. A run of underfloor duct, which comprises a fitting having sockets at each end for the reception of the ends of duct and a passage therethrough communicating with the duct, and a duct secured in the socket of the fitting and communicating with the passage therein, the end of at least one of said ducts being cut off at a lateral angle to connect with the fitting at an angle and the sides of the corresponding socket being flared to accommodate the increased width of the duct caused by the angular cut end thereof.

5. A duct system comprising a laterally curved fitting having, a pair of opposite flanges at each end disposed at an angle to each other for the reception of the ends of duct, a duct secured between each pair of flanges of the fitting, the end of at least one of the ducts being cut off at a lateral angle to connect with the fitting at an angle and a pair of opposite outwardly flaring flanges connecting the first-named flanges at each end of the fitting to accommodate the increased width of the duct caused by the angularly cut end thereof, whereby the angle between the two ducts procured by the fitting is increased or decreased by the angular relation of said one duct and the fitting.

HERVEY S. WALKER.